US008691167B2

(12) United States Patent
Flynn

(10) Patent No.: US 8,691,167 B2
(45) Date of Patent: Apr. 8, 2014

(54) PROCESS FOR CONTROLLING CARBONYL SULFIDE PRODUCED DURING CHLORINATION OF ORES

(75) Inventor: Harry Eugene Flynn, Edmond, OK (US)

(73) Assignee: Tronox LLC, Oklahoma City, OK (US)

( * ) Notice: Subject to any disclaimer, the term of this patent is extended or adjusted under 35 U.S.C. 154(b) by 19 days.

(21) Appl. No.: 13/553,613

(22) Filed: Jul. 19, 2012

(65) Prior Publication Data

US 2014/0023573 A1    Jan. 23, 2014

(51) Int. Cl.
*B01D 53/48* (2006.01)
*B01D 53/68* (2006.01)
*C01G 23/02* (2006.01)

(52) U.S. Cl.
USPC .............. 423/69; 423/74; 423/79; 423/242.1; 423/243.01; 423/492; 423/610

(58) Field of Classification Search
USPC ........ 423/242.1, 243.01, 69, 74, 79, 492, 610
See application file for complete search history.

(56) References Cited

U.S. PATENT DOCUMENTS

| | | | | |
|---|---|---|---|---|
| 3,615,163 | A | * | 10/1971 | Brzozowski ............ 423/240 R |
| 4,478,800 | A | | 10/1984 | Van Der Wal |
| 4,485,189 | A | | 11/1984 | Dupin |
| 4,511,668 | A | | 4/1985 | Nozue |
| 4,544,534 | A | | 10/1985 | Dupin |
| 5,585,078 | A | * | 12/1996 | Reis et al. ...................... 423/74 |
| 5,670,121 | A | | 9/1997 | Elkins |
| 5,824,277 | A | * | 10/1998 | Campos et al. ............ 423/242.1 |
| 5,861,099 | A | | 1/1999 | Hartmann |
| 5,942,201 | A | | 8/1999 | Hartmann |
| 5,990,372 | A | | 11/1999 | Blankenship |
| 6,124,410 | A | | 9/2000 | Ito |
| 6,399,033 | B1 | | 6/2002 | Hartmann |
| 6,951,635 | B2 | | 10/2005 | Gangwal |
| 6,956,006 | B1 | | 10/2005 | Mirsky |
| 7,153,488 | B2 | | 12/2006 | Messer |
| 7,261,870 | B2 | | 8/2007 | Coulson |
| 7,374,737 | B2 | | 5/2008 | Nedez |
| 7,427,385 | B2 | | 9/2008 | Scheirer |
| 2006/0108262 | A1 | | 5/2006 | Takatsu |
| 2008/0267846 | A1 | | 10/2008 | Haas |
| 2008/0305032 | A1 | | 12/2008 | Cronin |

(Continued)

FOREIGN PATENT DOCUMENTS

| EP | 218153 | 10/1987 |
|---|---|---|
| EP | 952111 | 2/2003 |

(Continued)

OTHER PUBLICATIONS

Litong Liang, et al., Investigation on COS Hydrolysis Over TiO2 Alumina Catalyst, Taiyuan University of Technology, 2008, 3 pgs, China.

*Primary Examiner* — Timothy Vanoy
(74) *Attorney, Agent, or Firm* — McAfee & Taft

(57) ABSTRACT

The present invention provides for a process for handling carbonyl sulfide waste and waste metal halides produced in industrial processes and, more particularly chlorination processes. The process includes the steps of hydrolyzing the carbonyl sulfide to produce a waste stream containing hydrogen sulfide and sulfidizing the resulting hydrogen sulfide containing stream with a solution of the waste metal halides. The resulting metal sulfide and metal halide-containing stream can be neutralized before disposal of the produced waste solids.

17 Claims, 1 Drawing Sheet

(56) References Cited

U.S. PATENT DOCUMENTS

| | | |
|---|---|---|
| 2009/0148363 A1 | 6/2009 | Keegel |
| 2009/0324460 A1 | 12/2009 | Robinson |
| 2009/0324461 A1 | 12/2009 | Robinson |

FOREIGN PATENT DOCUMENTS

| | | |
|---|---|---|
| GB | 1332805 | 10/1973 |
| WO | WO9619281 | 6/1996 |
| WO | WO2009018501 | 2/2009 |

* cited by examiner

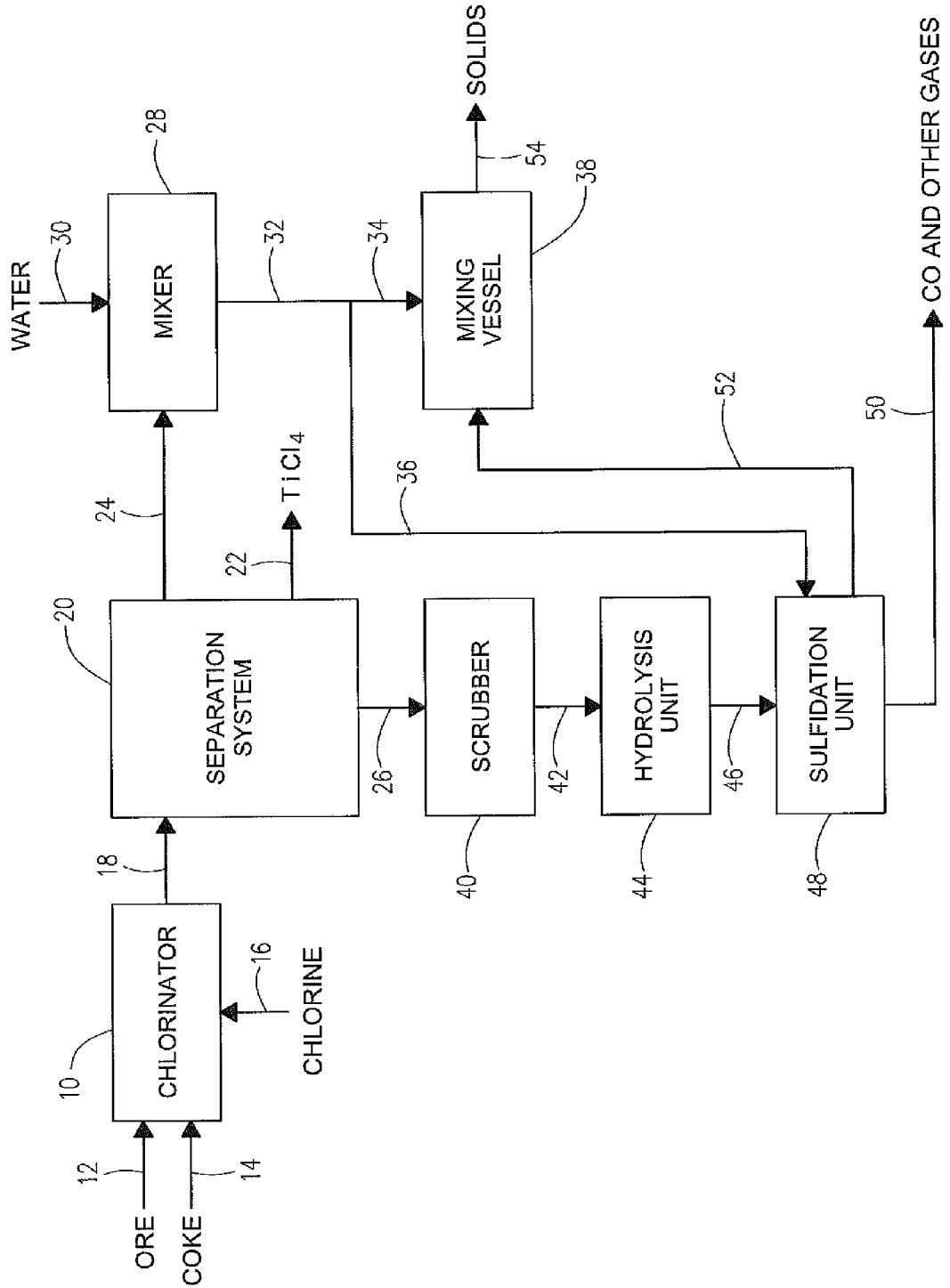

US 8,691,167 B2

PROCESS FOR CONTROLLING CARBONYL SULFIDE PRODUCED DURING CHLORINATION OF ORES

FIELD OF THE INVENTION

The present invention relates to handling carbonyl sulfide waste and waste metal halides produced in industrial processes and, more particularly chlorination processes. In particular, the present invention relates to processes for handling carbonyl sulfide produced during the carbochlorination of ores. More particularly but without limitation thereto, embodiments of the present invention relate to the handling of carbonyl sulfide produced during the carbochlorination of titanium ores such as in processes for the production of titanium dioxide.

BACKGROUND OF THE INVENTION

Carbochlorination processes are utilized in the purification of metal oxide containing ores to produce commercially desirable metals and metal compounds, such as aluminum, zirconium and titanium metals and metal compounds.

In the commercial processes utilizing such carbochlorination processes, a metal oxide bearing ore is chlorinated in the presence of a carbonaceous material as a reducing agent. The carbonaceous materials, typically coke, contain sulfur, which is consumed in the chlorination step. The chlorinator is operated under reducing conditions in order to chlorinate the metal oxide in the ore to form a metal chloride. As a result, the sulfur ends up as a reduced sulfur species, predominantly carbonyl sulfide (carbon oxysulfide) (COS). Accordingly, the gas mixture leaving the reactor contains the metal chlorides, coke, unreacted ore, silicon dioxide, carbon dioxide, carbon monoxide, nitrogen, hydrogen chloride and carbonyl sulfide.

Removal of sulfur from exhaust gases is one of the most important environmental tasks facing industrial manufacturers. Moreover, carbonyl sulfide is difficult to scrub and any venting of the carbonyl sulfide to the atmosphere could count against a production plant's permitted emissions. Alternatively, the sulfur compounds can be oxidized in a thermal oxidizer to form sulfur dioxide ($SO_2$) and scrubbed with sodium hydroxide, a very expensive neutralizer. Accordingly, manufactures utilizing carbochlorination processes have often resorted to utilizing cokes having a low sulfur content rather than less expensive higher sulfur containing cokes in order to minimize the cost of having to deal with carbonyl sulfide.

SUMMARY OF THE PRESENT INVENTION

The present invention in one aspect concerns methods to utilize cokes with relatively higher sulfur contents in carbochlorination processes and yet minimize or eliminate carbonyl sulfide emissions. More specifically, an aspect of the present invention is to minimize or eliminate carbonyl sulfide in carbochlorination processes for the production of titanium tetrachloride from titanium dioxide containing ores.

In a particular embodiment there is provided a method of reducing carbonyl sulfide waste product from a manufacturing process that produces waste metal halides and carbonyl sulfide as waste products. In the method the waste products are separated into a first stream containing the waste metal halides and a second stream containing the carbonyl sulfide. The first stream is combined with a liquid such that the waste metal halides are dissolved in the liquid to produce a metal halide solution. The second stream is hydrolyzed so that at least a portion of the carbonyl sulfide is converted into hydrogen sulfide and carbon dioxide. Subsequently, the hydrogen sulfide is contacted with a first portion of the metal halide solution under sulfidation conditions to produce a sulfidation stream containing metal sulfide.

In another embodiment there is provided a process for producing carbon tetrachloride from titanium dioxide bearing ores. The process comprising chlorinating the titanium dioxide bearing ores in the presence of a sulfur containing carbonaceous material (typically coke) as a reducing agent to produce a product stream containing titanium tetrachloride, a waste metal chloride and carbonyl sulfide. The product stream is separated into a first stream containing titanium tetrachloride, a second stream containing the waste metal chloride and a third stream containing the carbonyl sulfide. The second stream is combined with a liquid such that the waste metal chloride is dissolved in the liquid to produce a metal chloride solution. Subsequently, the metal chloride solution is split into a first portion and a second portion. The first portion of the metal chloride solution is neutralized. The third stream, containing carbonyl sulfide, is hydrolyzed so that at least a portion of the carbonyl sulfide is converted into hydrogen sulfide and carbon dioxide. The hydrogen sulfide is contacted with the second portion of the metal chloride solution under sulfidation conditions to produce a sulfidation stream having metal sulfide and unreacted metal chloride. The sulfidation stream is then neutralized.

BRIEF DESCRIPTION OF THE DRAWING

Embodiments of the present invention are described in detail below with reference to the attached FIGURE, wherein:

FIG. 1 is a schematic diagram of the process of the present invention in a preferred embodiment.

DETAILED DESCRIPTION OF EMBODIMENTS OF THE INVENTION

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

The improvements provided by the present invention stem from the discovery that portions of the waste metal halides produced during processes for producing metal halides, such as chlorination processes, can be used to convert problematic carbonyl sulfide to more easily handled metal sulfide. Thus, in accordance with the invention, two waste streams, which would otherwise require separate neutralization (using expensive neutralizers) before they can be disposed, are combined to form a denser disposable product (metal sulfide) with a concurrent reduction in the neutralizers required.

The invention will now be further described with respect to the carbochlorination of titanium dioxide ore to produce titanium tetrachloride; however, it should be understood that the invention is applicable to any process where waste metal halides and carbonyl sulfide are produced as by products. More particularly, the process is applicable to chlorination processes for producing metal chlorides such as titanium tetrachloride, zirconium chloride and aluminum chloride;

especially those chlorination processes that have sulfur present, such as carbochlorination processes that use coke as a carbon source.

Titanium tetrachloride ($TiCl_4$), which, for example, can be used for the production therefrom of titanium metal or titanium dioxide (commonly sold for use as a white pigment), is often produce by chlorination in the presence of carbon, also known as carbochlorination. In the carbochlorination step for the production of titanium tetrachloride, the following basic reaction step occurs:

$$TiO_2(ore)+C+2Cl_2 \rightarrow TiCl_4+CO+CO_2 \qquad (1)$$

In the commercial manufacture of titanium tetrachloride utilizing this reaction step, titanium-bearing ore, e.g., ilmenite, slag, synthetic or natural rutile, is chlorinated in the presence of coke as a reducing agent, conventionally in a fluid bed reactor at temperatures on the order of about 1000 degrees Celsius. The carbonaceous materials, typically coke, contain potentially sulfur, which is consumed in the chlorination step. The chlorinator is operated under reducing conditions in order to chlorinate the $TiO_2$ ore to form the titanium tetrachloride ($TiCl_4$). As a result, the sulfur ends up as a reduced sulfur species, predominantly carbonyl sulfide (carbon oxysulfide) (COS). Accordingly, the gas mixture leaving the reactor contains not only the product metal chloride, titanium tetrachloride, but also carbonyl sulfide and waste metal chlorides produced from other metal oxides present in the ore, also known as non-product metal chlorides. Also, other compounds will be present, such as unreacted ore, gangue, carbon monoxide, carbon dioxide and hydrogen chloride, as further described below.

The gas mixture leaving the chlorinator is traditionally cooled and separated to separate the titanium tetrachloride, waste metal chlorides and non-condensable gases (COS, CO, $CO_2$, etc.). In prior art processes the waste metal chlorides and non-condensable gases were separately treated for waste disposal.

In accordance with the invention, the carbonyl sulfide in the non-condensable gases is hydrolyzed to form various compounds including hydrogen sulfide ($H_2S$). The carbonyl sulfide is hydrolyzed to form hydrogen sulfide in accordance with the following reaction:

$$COS+H_2O \rightarrow H_2S+CO_2 \qquad (2)$$

Subsequently, the hydrogen sulfide is treated by metal sulfidation. The metal sulfidation is carried out using the waste metal chloride. An exemplary metal sulfidation reaction is shown below:

$$FeCl_2+H_2S \rightarrow FeS+2HCl \qquad (3)$$

While in the above reaction iron chloride is used, it should be understood that other metal halides can be used in the sulfidation step and other metal sulfides can be formed, for example $FeS_2$, MnS and $Cr_2S_3$. While other metal halides can be used, it is especially advantageous to use metal halides resulting from the chlorination step. Accordingly, the metal halides used for the metal sulfidation step will be a mixture of metal halides and, more particularly a mixture of metal chlorides. Generally, the metal halides can include halides of Fe, Mn, Cr, Ni, V, Ca, Mg, P, Ga, As, Nb, Na, Zr, and Al and mixtures of such metal halides with metal halides of Fe and Mn being preferred because they generally are the most abundant. For the production of titanium tetrachloride, the preferred metal halides used in the sulfidation reaction will be metal chlorides produced during chlorination and more preferably metal chlorides of Fe and Mn. It should be understood that in cases where the metal has forms with different oxidation numbers (for example iron and chromium) the terms metal halides, metal chlorides, metal sulfides and such refer to halides, chlorides and sulfides of all the metal forms, unless otherwise indicated, i.e. iron chloride or chlorides of iron refer to both ferrous chloride ($FeCl_2$) and ferric chloride ($FeCl_3$).

Turning now to FIG. 1, the process of the present invention will be described more fully. Metal oxide ore 12, coke 14 and chlorine 16 are introduced into chlorinator 10 wherein chlorination in the presence of a carbon source, such as the coke, occurs. The product stream 18 will be a gaseous mixture and contain the desired product metal chloride (for example $TiCl_4$), waste metal chloride, unreacted ores, coke, gangue, hydrogen chloride (HCl), carbon monoxide, carbon dioxide, carbonyl sulfide and other gases. The product stream 18 is introduced into a separation system 20.

In separation system 20, the product stream is separated into a first stream 22 containing the metal chloride product; a second stream 24 containing waste metal chloride, unreacted ores, coke and gangue; and a third stream 26 containing hydrogen chloride, carbon monoxide, carbon dioxide, carbonyl sulfide and other non-condensable gases. Generally, the product steam will be separated in separation system 20 by condensing and separating the product stream in stages. For example, if titanium tetrachloride is the desired product stream, the product stream would be condensed or cooled to allow condensation of most of the waste metal chlorides. A gas/solids separation would be performed to remove the condensed waste metal chlorides and other solids, such as unreacted ore, coke and gangue. The remaining product stream would then be further condensed or cooled followed by separating most of the titanium tetrachloride from the non-condensable gases. The gas/solids separations can be performed in a cyclone, settling chamber or other solids separation device.

The first stream 22 containing the product metal chloride can be sent for further purification and processing. Thus, in the case of product titanium tetrachloride, the first stream 22 could be purified to further remove any waste metal chlorides or other impurities entrain in the stream and then further processed by oxidation to produce a purified titanium dioxide product.

The second stream 24 is introduced into mixer 28. A liquid 30 suitable for dissolving most, if not all, the waste metal chlorides is also introduced into mixer 28 so that a metal chloride solution 32 is produced. Water is the preferred solvent, although others can be used. Optionally, prior to, after or as part of mixer 28, other components of the second stream can be separated from the waste metal chloride. For example, unreacted ore and coke can be separated from the waste metal chloride and returned to chlorinator 10.

Waste metal chloride solution 32 is split into a first portion 34 and a second portion 36. The first portion 34 is introduced into a mixing vessel 38. The second portion 36 is introduced into sulfidation unit 48.

Returning now to separator 20, the third stream 26 from separator 20 may be treated to remove or neutralize components of the third stream, such as recovering or neutralizing hydrogen chloride in HCl scrubber 40. Stream 42, exiting scrubber 40, is introduced into hydrolysis unit 44. In hydrolysis unit 44, carbonyl sulfide is hydrolyzed to form hydrogen sulfide. The hydrolysis may be accomplished by conventional processes and may use catalyst as discussed in U.S. Pat. Nos. 4,511,668 and 5,942,201. Also, suitable catalysts are sold under the names Actisorb 410 by Sud-Chemie AG and Hydrocel 640 by Porocel.

Stream 46 leaving hydrolysis unit 44 contains largely hydrogen sulfide, carbon monoxide, carbon dioxide and nitrogen. Stream 46 is introduced into sulfidation unit 48 wherein hydrogen sulfide is reacted with the waste metal chlorides from the second portion 36 of the waste metal chloride solution 32 to produce metal sulfide and hydrogen chloride. Sulfidation unit 48 can be any suitable vessel for mixing a liquid solution with gas for reaction, such as a gas dispersion mixer in a tank, a packed column or a sparger in a vessel. For sulfidation, the gas/metal chloride solution mixture should be kept at a near neutral pH (near 7 pH), which can be 5 to 8 pH. Generally, the mixture can be kept at a pH in the range of from 5.6 to 6.9. The pH of the mixture can be maintained by the addition of a caustic, such as calcium hydroxide ($Ca(OH)_2$). Accordingly, the hydrogen chloride produced by the sulfidation step is neutralized in sulfidation unit 48. If calcium hydroxide is used, the hydrogen chloride will react with the calcium hydroxide to form calcium chloride ($CaCl_2$). The metal chloride solution 36 entering sulfidation unit 48 can have a concentration as high as 130 grams of metal per liter of water. Generally, for iron chloride ($FeCl_2$) the concentration can be in the range from about 20 to about 130 grams Fe/liter, preferably it will be about 30 grams Fe/liter. The sulfidation can be carried out at ambient temperature and pressure.

The unreacted gas species 50 from sulfidation unit 48 are disentrained from the liquid phase and can be further treated, such as by acid scrubbing and waste gas incinerating (not shown).

Any unreacted metal chloride solution, along with metal sulfide and calcium chloride formed, are withdrawn from sulfidation unit 48 and introduced via stream 52 to mixing vessel 38. Within mixing vessel 38, any metal chloride from sulfidation unit 48 and any waste metal chloride from stream 34 are neutralized by mixing with an alkaline neutralizer in order to raise the pH of the slurry in mixing vessel 38 to about 8.5. The alkaline neutralizer can be, for example, calcium hydroxide, calcium oxide, fly ash, and similar compounds. Often the calcium hydroxide will be added as the alkaline neutralizer in the form of dry lime and may be used in combination with one or more other materials, for example, cement kiln dust, lime kiln dust and fly ash from coal-fired power plants. Where either cement kiln dust or lime kiln dust are used with the dry lime, preferably the cement kiln dust and/or lime kiln dust are used in a first step to bring the solution's pH to about 4.5, then the dry lime is applied to raise the solution's pH to about 8.5. Where fly ash is used in combination with the dry lime, these materials can be applied sequentially as just described, or simply as a mixture in a single stream. The cement kiln dust, lime kiln dust and the fly ash from the coal-fired power plants are all commercially-available materials from companies such as Holcim Ltd. (Zurich) and LaFarge Group (Paris) in regard to cement kiln dust, from Graymont Inc. (Richmond, British Columbia, Canada) or Greer Lime Company (Riverton, W. Va.) as to lime kiln dust and as to the fly ash from any of a number of coal-fired power plants. The use of calcium oxide, kiln dust or fly ash to neutralize the HCl generated in the sulfidation step is generally less expensive than using sodium hydroxide after the thermal oxidation step to scrub and neutralize the $SO_2$ formed if the COS was not removed in the hydrolysis/lime neutralization process.

As a consequence of the neutralization step, the dissolved waste metal chlorides are reacted to form metal hydroxides. The metal hydroxides and metal sulfides are preferably substantially completely precipitated out as a solid waste mass 54 suitable for direct landfilling, or other disposal.

As can be seen from the above, the present invention has numerous advantages including reducing the amount of caustic needed for neutralization of waste by-products. Additionally, an advantage of the inventive process is that most of the metal chloride will be consumed as metal sulfide, which is much denser than the iron hydroxide that is typically produced by neutralization, so a gain in waste storage capacity will be realized.

ILLUSTRATIVE EXAMPLES

The present invention is illustrated more particularly by the following examples. In the example, percentages are weight percents unless otherwise indicated.

Example 1

Carbonyl sulfide hydrolysis was carried out using a packed bed of catalyst. The reactor had a 12-inch deep bed and was 1 inch in diameter. Hydrolysis was carried out for a gas mixture of 8.5% $N_2$, 44% CO, 44% $CO_2$ and 1.5% $H_2O$ with 4.375 mls/min of COS using a Sud-Chemie Actisorb 410 catalyst at 280° F. The gas mixture resulting from hydrolysis contained 4.2% $H_2S$ and 790 ppm COS. It was suitable for metal sulfidation removal of $H_2S$ with waste metal chloride solution.

Example 2

Carbonyl sulfide hydrolysis was carried out using a packed bed of catalyst. The reactor had a 12-inch deep bed and was 1 inch in diameter. Hydrolysis was carried out for a gas mixture of 8.5% $N_2$, 44% CO, 44% $CO_2$ and 1.5% $H_2O$ with 4.375 mls/min of COS using a Sud-Chemie Actisorb 410 catalyst at 310° F. The gas mixture resulting from hydrolysis contained 4.7% $H_2S$ and 400 ppm COS. It was suitable for metal sulfidation removal of $H_2S$ with waste metal chloride solution.

Example 3

Carbonyl sulfide hydrolysis was carried out using a packed bed of catalyst. The reactor had a 12-inch deep bed and was 1 inch in diameter. Hydrolysis was carried out for a gas mixture of 8.5% $N_2$, 44% CO, 44% $CO_2$ and 1.5% $H_2O$ with 4.375 mls/min of COS using a Porocel Hydrocel 640 catalyst at 313° F. The gas mixture resulting from hydrolysis contained 3.8% $H_2S$ and 400 ppm COS. It was suitable for metal sulfidation removal of $H_2S$ with waste metal chloride solution.

While the technology has been described with respect to the production metal chlorides and particularly titanium tetrachloride, it should be understood that the invention is applicable to any process that generates carbonyl sulfide and waste metal halides. While the technology has been particularly shown and described with reference to specific embodiments, it should be understood by those skilled in the art that various changes in form and detail may be made without departing from the spirit and scope of the technology as defined by the appended claims.

What is claimed is:
1. A method of reducing carbonyl sulfide waste product in a manufacturing process that produces waste metal halides and carbonyl sulfide as waste products, said method comprising:
  (a) separating said waste products into a first stream containing said waste metal halides and a second stream containing said carbonyl sulfide;

(b) combining said first stream with a liquid such that said waste metal halides are dissolved in said liquid to produce a metal halide solution;

(c) hydrolyzing said second stream so that at least a portion of said carbonyl sulfide is converted into hydrogen sulfide and carbon dioxide; and (d) contacting said hydrogen sulfide with a first portion of said metal halide solution under sulfidation conditions to produce a sulfidation stream containing metal sulfide.

2. The method of claim 1 further comprising combining said sulfidation stream with a second portion of said metal halide solution and neutralizing the resulting combined stream so that said waste metal halides in said combined stream are reacted to produce a metal hydroxide.

3. The method of claim 2 wherein said neutralizing step is carried out by mixing said combined stream with calcium hydroxide, calcium oxide, fly ash, or other alkaline neutralizer.

4. The method of claim 1 wherein said process is a carbochlorination process for producing a product metal chloride and said waste metal halides are non-product metal chlorides.

5. The method of claim 1 wherein said process is a carbochlorination process for producing titanium tetrachloride and said waste metal halides are chlorides of one or more metals selected from the group consisting of Fe, Mn, Cr, Ni, V, Ca, Mg, P, Ga, As, Nb, Na, Zr, and Al.

6. The method of claim 5 further comprising combining said sulfidation stream with a second portion of said metal halide solution and neutralizing the resulting combined stream so that said waste metal halides in said combined stream are reacted to produce a metal hydroxide.

7. The method of claim 6 wherein said neutralizing step is carried out by mixing said combined stream with calcium hydroxide.

8. A process for producing titanium tetrachloride from titanium dioxide bearing ores comprising:

(a) chlorinating said titanium dioxide bearing ores in the presence of a sulfur containing carbonaceous material as a reducing agent to produce a product stream containing titanium tetrachloride, a waste metal chloride and carbonyl sulfide;

(b) separating said product stream into a first stream containing titanium tetrachloride, a second stream containing said waste metal chloride and a third stream containing said carbonyl sulfide;

(c) combining said second stream with a liquid such that said waste metal chloride is dissolved in said liquid to produce a metal chloride solution;

(d) splitting said metal chloride solution into a first portion and a second portion;

(e) neutralizing said first portion of said metal chloride solution;

(f) hydrolyzing said third stream so that at least a portion of said carbonyl sulfide is converted into hydrogen sulfide and carbon dioxide;

(g) contacting said hydrogen sulfide with said second portion of said metal chloride solution under sulfidation conditions to produce a sulfidation stream having metal sulfide and unreacted metal chloride; and (h) neutralizing said sulfidation stream.

9. The process of claim 8 wherein said neutralizing step (e) and said neutralizing step (h) are carried out by combining said sulfidation stream and said first portion of said metal chloride solution and mixing the thus produce combined stream with calcium hydroxide so that said metal chloride in said combined stream react to produce metal hydroxide.

10. The process of claim 9 wherein the pH of the combined steam is raised to about 8.5 by mixing with calcium hydroxide, calcium oxide, fly ash or other alkaline neutralizer.

11. The process of claim 8 wherein said sulfidation conditions including keeping the pH of the thus contacted hydrogen sulfide and second portion of said metal chloride near 7.

12. The process of claim 11 wherein the pH range during sulfidation is from 5.6 to 6.9.

13. The process of claim 12 wherein the pH is controlled during sulfidation by adding calcium hydroxide.

14. The process of claim 8 wherein said waste metal chlorides are chlorides of one or more metals selected from the group consisting of Fe, Mn, Cr, Ni, V, Ca, Mg, P, Ga, As, Nb, Na, Zr, and Al.

15. The process of claim 8 wherein said waste metal chlorides are chlorides of one or more metals selected from the group consisting of Fe and Mn.

16. The process of claim 8 wherein said titanium tetrachloride in said first stream is reacted in an oxidation process to produce titanium dioxide.

17. A process for producing titanium tetrachloride from titanium dioxide bearing ores comprising:

(a) chlorinating said titanium dioxide bearing ores in the presence of a sulfur containing coke as a reducing agent to produce a product stream containing titanium tetrachloride, iron chloride and carbonyl sulfide;

(b) separating said product stream into a first stream containing titanium tetrachloride, a second stream containing said iron chloride and a third stream containing said carbonyl sulfide;

(c) combining said second stream with a liquid such that said iron chloride is dissolved in said liquid to produce an iron chloride solution;

(d) splitting said iron chloride solution into a first portion and a second portion;

(e) hydrolyzing said third stream so that at least a portion of said carbonyl sulfide is converted into hydrogen sulfide and carbon dioxide;

(f) contacting said hydrogen sulfide with said second portion of said iron chloride solution under sulfidation conditions to produce a sulfidation stream having iron sulfide and unreacted iron chloride;

(g) combining said first portion of said metal chloride solution with said sulfidation stream;

(h) mixing said thus combined streams with calcium hydroxide so that said iron chloride in said combined stream reacts to produce iron hydroxide; and (i) precipitating out said iron sulfide and iron hydroxide for waste disposal.

* * * * *